Sept. 21, 1965 B. J. BREZOSKY 3,207,837
POWER UNIT FOR PORTABLE FOOD WASTE DISPOSER
Original Filed Sept. 14, 1962 2 Sheets-Sheet 1
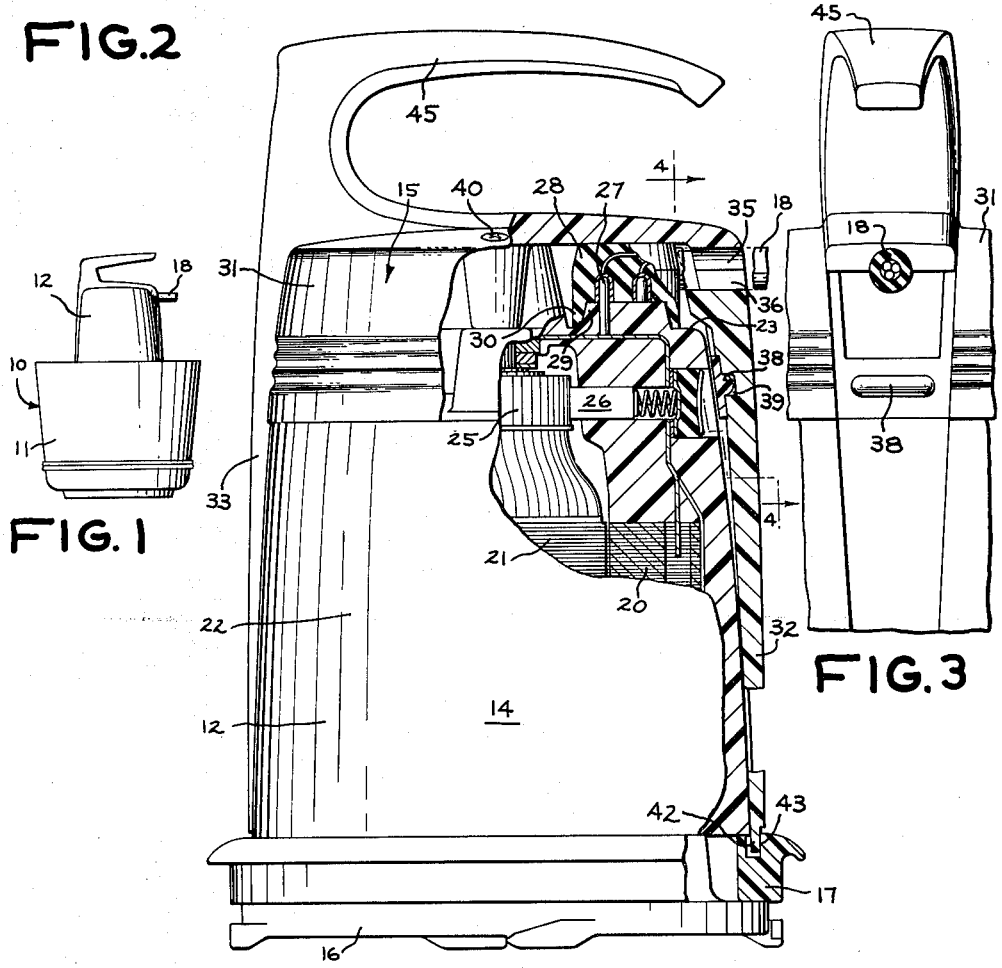
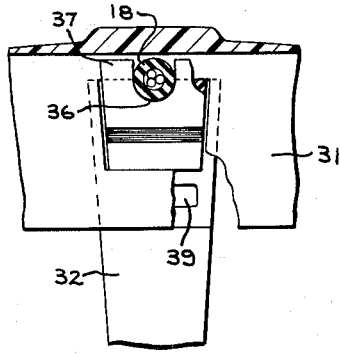
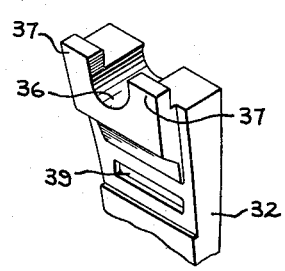
INVENTOR.
BERNARD J. BREZOSKY
BY James E. Espe
HIS ATTORNEY Sept. 21, 1965  B. J. BREZOSKY  3,207,837
POWER UNIT FOR PORTABLE FOOD WASTE DISPOSER
Original Filed Sept. 14, 1962  2 Sheets-Sheet 2
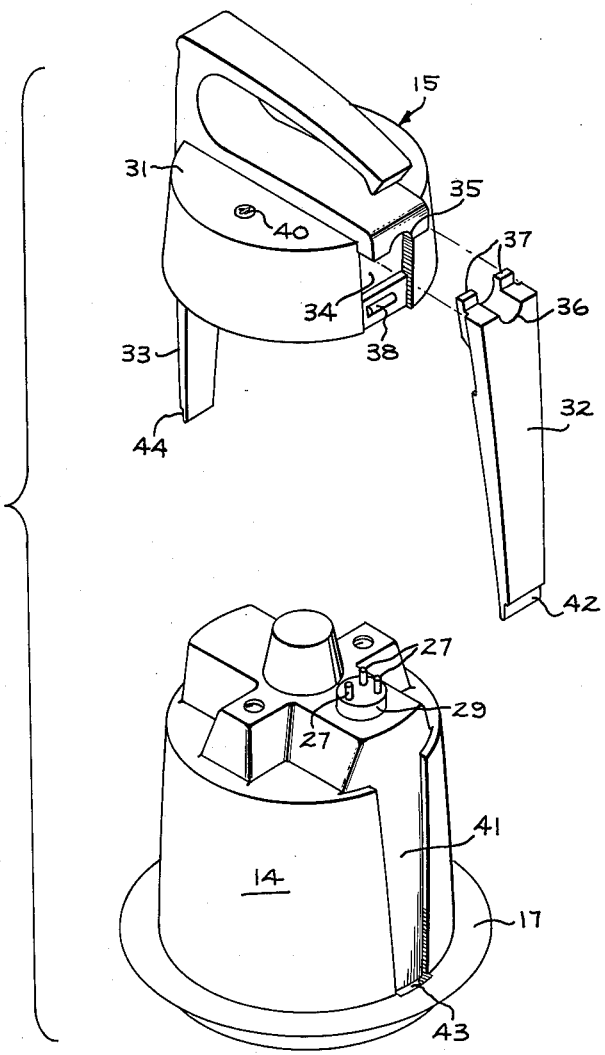
INVENTOR.
BERNARD J. BREZOSKY
BY James E. Espe
HIS ATTORNEY

United States Patent Office 3,207,837
Patented Sept. 21, 1965

3,207,837
POWER UNIT FOR PORTABLE FOOD
WASTE DISPOSER
Bernard J. Brezosky, Louisville, Ky., assignor to General
Electric Company, a corporation of New York
Continuation of application Ser. No. 223,744, Sept. 14,
1962. This application Aug. 7, 1964, Ser. No. 388,180
6 Claims. (Cl. 174—65)

This application comprises a continuation of the copending application of Bernard J. Brezosky, Serial No. 223,744, filed September 14, 1962, which application is now abandoned.

This invention relates to small electric power tools and particularly to a power unit for a portable food waste disposer that requires a continuous water supply for the grinding system.

This invention relates to a motor unit for the portable food waste disposer that is disclosed and claimed in U.S. Patent 3,094,291 of Lindstrom et al. which issued on June 18, 1963, and which is assigned to the General Electric Company, the same assignee as in the present invention. In a portable food waste disposer of the class described there are two main elements; namely, a combined hopper and comminuting chamber having comminuting means therein and a removable power unit that is capable of being fastened over the mouth of the hopper to provide the driving power for the comminuting means. The kitchen waste must be comminuted in the presence of water so as to obtain a flowable mixture that may be flushed into the sewer system provided for the home. Accordingly, this portable disposer is designed to be used in the kitchen sink, and water is supplied continuously to the hopper during the comminuting operation. This water flowing down around the motor into the hopper constitutes a potential electrical hazard which must be given serious consideration in the design of the motor and the flexible electrical cord for energizing the motor.

It is an object of this invention to provide a portable power unit with a suitable water-tight connection between the power unit and the connector of a flexible electric cord.

It is another object of this invention to provide a small electric motor with a removable two-piece cover assembly to allow a flexible electric cord to enter the cover assembly, and to provide a water-tight connection between the cord and the terminals of the motor.

It is a further object of the present invention to provide a novel means to fasten a cover assembly over the terminal end of an electric motor.

Briefly stated, in accordance with one aspect of the present invention, the fractional horsepower motor is provided with exposed electrical terminals at one end thereof. A cover assembly is provided and includes a cover member fitted over the terminal end of the motor housing. A flexible electrical cord is provided to conduct electrical power to the motor and has a connector held onto the terminals by the cover member. The cover member has an opening in one side thereof sufficiently large to allow the connector on the cord to pass therethrough. The electrical cord extends through the opening and a strap member is provided having one end interlocked with the opening and means are provided to secure the distal end of the strap against the side of the motor housing.

In a more specific embodiment of the present invention, there are also included means to secure the cover member to the terminal end of the motor housing to hold the cover assembly to the housing. Also, the electrical cord is provided with a telescoping connector that is compressed in substantially water-tight fashion over the motor terminals when the assembly is assembled to the motor housing.

While the specification concludes with claims particularly pointing out and distinctly claiming the subject matter which is regarded as the invention, it is believed the invention wll be better understood from the following description taken in connection with the accompanying drawings, in which:

FIGURE 1 is a general view in elevation on a reduced to scale of a portable food waste disposer for which the present invention is particularly adapted;

FIGURE 2 is an elevational view in full scale of the power unit of FIGURE 1 with parts broken away to show the connection of the cover assembly and the electrical cord to the motor;

FIGURE 3 is a fragmentary right side elevational view of the power unit of FIGURE 2 showing the cooperation between the cover assembly and the flexible electric cord;

FIGURE 4 is a fragmentary view of the interlocking relation between the cover member and the separable strap member and it is taken along line 4—4 of FIGURE 2;

FIGURE 5 is a perspective view of the top interlocking end of the separable strap member; and FIGURE 6 is an exploded perspective view of the present invention.

Turning now to a consideration of the drawing and in particular to FIGURE 1, there is shown a general view of a portable food waste disposer 10 which is of the type disclosed and claimed in the aforementioned Lindstrom et al. Patent No. 3,094,291. This unit is formed of two major separable parts; namely, a lower hopper 11 and an upper motor unit 12. The disposer 10 is to be used in the kitchen sink over the sink drain, and the kitchen faucet would be positioned so that water will be running into the hopper during the entire grinding operation. The hopper 11 not only serves as a container for the food waste, but its bottom wall is formed by a comminuting unit (not shown) which consists of a rotating flywheel within a stationary shredding ring. First, the food waste is loaded into the hopper and then the power unit 12 is fastened over the mouth of the hopper and operatively connected to a vertical shaft (not shown) that rises from the flywheel at the bottom wall of the hopper. When the power unit is energized, the food waste is propelled outwardly by centrifugal force against the shredding ring and the waste is comminuted and discharged into a sump beneath the flywheel through a suitable discharge opening in the shredding ring and finally out the bottom of the hopper and into the sink drain.

A full size view of the power unit 12 is given in FIGURE 2. This power unit consists of five main elements; namely, a motor housing 14, a cover assembly 15, a speed reduction gear housing 16 at the lower end of motor housing 14, a splash guard 17 in the form of a resilient annular band fitted into an annular groove in the gear housing 16, and a flexible electrical cord 18 which is adapted to be connected at one end to the motor and at its opposite end to a wall mounted convenience outlet (not shown).

The present invention is primarily concerned with the design of the cover assembly 15 and its cooperation with the electrical cord 18, but brief mention will be made here of the other elements of the power unit in order to facilitate the understanding of the complete assembly that has been illustrated. The motor housing 14 is illustrated as an encapsulated series motor which is described and claimed in the copending application of Marcus P. Hogue, Serial No. 213,685, entitled "Encapsulated Electric Motor and Method of Making Same" which was filed on July 31, 1962, and is assigned to the General Electric Company, assignee of the present invention. The motor includes a stator 20 and an armature 21. The stator 20 is encapsulated in a molding compound such as a suitable epoxy resin to form a molded motor housing 14. Housing 14 has a substantially cylindrical side wall 22 in which the stator 20 is located, and a top wall 23 in which is centrally located a bearing member for receiving one end of a shaft extending through armature 21. The armature 21 includes a commutator 25 that cooperates with a pair of diametrically opposed carbon brushes 26.

Electrical power is transmitted to motor unit 12 by means of three terminal pins 27 (best seen in perspective in FIGURE 6) which extend outwardly from the top wall 23 of motor housing 14 and are adapted to receive a connector 28 which is molded on one end of the flexible electrical cord 18. The three terminal pins 27 are mounted in a raised boss 29 and connector 28 is provided with a skirt member 30 which is adapted to fit around boss 29 in a tight wedging action to provide a substantially water-tight seal therebetween.

Generally, the flexible electrical cord 18 will be a three-wire cord including three separately insulated conductors which are wound together and covered with an overall jacket of resilient material such as vinyl, synthetic rubber or the like. At each end of the cord there is an integrally molded enlargement which in one case is a pronged plug (not shown) adapted to cooperate with a normal electrical convenience outlet, and at the other end an integrally molded connector, such as connector 28, having a series of three female sockets for receiving the terminal pins 27. The integrally molded enlargement at each end of the cord presents a problem in assembling the cord through the cover associated with the motor. One possible solution would be for the appliance manufacturer to ship the cover to the electrical cord manufacturer who would then mold just one plug or connector to the cord and then string the cord through an opening in the cover and then mold the other end of the cord thus making a captive assembly. The disadvantages of this proposal are that it would be impossible to replace either one of these parts, the cord or the cover, separately in the field, and of course there would be the added cost of shipping the cover to and from the cord manufacturer.

The present invention is particularly directed toward solving the above-mentioned problem. The cover assembly 15 includes two major parts; namely, a cover member 31 and a strap member 32. Cover member 31 is of generally down-turned cup-shape to encompass the terminal end of motor housing 14 and has an integrally formed depending strap 33. Cover member 31 is provided with an enlarged opening 34 in its side opposite strap 33. Opening 34 is sufficiently large to allow connector 28 to easily pass therethrough. The top edge of opening 34 is provided with a generally semi-circular slot 35. Strap member 32 has, near its upper end, a semi-circular slot 36 and a pair of tabs 37. Strap 32 is assembled to cover member 31 by inserting tabs 37 through opening 34 and slipping tabs 237 upwardly behind the upper extremity of opening 34 in the manner illustrated in FIGURE 4. This provides an interlocking relationship between strap 32 and cover member 31. Along the lower edge of opening 34 is an embossment 38 which strengthens cover member 31 in the vicinity of opening 34. Embossment 38 fits into a mating groove 39 in strap member 32 to provide a close fitting relationship between cover member 31 and strap member 32.

After strap member 32 has been interlocked with cover member 31, cover member 31 is fastened to motor housing 14 by means of screw fasteners 40 which extend through the top of cover member 31 and are threaded into top wall 23 of the motor housing. The lower free ends of strap member 32 and strap 33 are held tightly against the sides of motor housing 14 by splash guard 17. As most clearly illustrated in FIGURE 6, a slot 41 is provided in motor housing 14 to receive strap member 32. A second slot is provided in motor housing 14 diametrically opposite slot 41 to accommodate strap 33. The lower end of strap member 32 is notched thereby creating a tab 42 which is received in a slot 43 in splash guard 17. Strap 33 has a similarly formed tab 44 which cooperates with splash guard 17 in the same manner as tab 42. This arrangement holds the distal, or free, ends of the strap member 32 and strap 33 tightly against the motor housing 14 so that it is unnecessary to provide screw fasteners extending through either strap member 32 or strap 33 into the sides of motor housing 14. If screws were necessary, the design would not be as attractive as the plane surfaces of this design, and it would complicate the molding operation of the encapsulated motor.

The opening defined by semi-circular slots 35 and 36 when cover assembly 15 is completely assembled, is slightly smaller in diameter than the outer diameter of cord 18. This provides a strain relief feature so that tension applied to cord 18 will not tend to disrupt the electrical connection between connector 28 and terminal pins 27. It should also be noticed that connector 28 is of enlarged shape so that it fills the space between the top wall 23 of housing 14 and cover member 31 so that when cover member 31 is fastened to the motor housing, connector 28 is tightly compressed over the raised boss 29 to provide a water-tight seal between connector 27 and housing 14. Accordingly, it is possible to completely immerse this power unit and operate the motor for days at a time without creating an electrical hazard.

An alternative is to eliminate the strain relief feature from the cover assembly so that if the power unit were dropped and the plastic cover were broken, the integrity of the strain relief would not be affected. This is accomplished by enlarging the opening defined by semi-circular slots 35 and 36 so that the cord is not clamped in this opening and by carrying the cord in a circuitous path over the top wall 23 of motor housing 14 and providing a metal strap fastened by screw fasteners (not shown) to the housing 14 to firmly attach a looped portion of cord 18 to housing 14. The connector 28 of cord 18 would be sealed over raised boss 29 in the same manner shown.

Cover assembly 15 may include a handle portion 45 which would overlie the motor and provide an easy means to carry, turn and handle the motor in general. A preferred material for the cover assembly 15 is a polypropylene material which has good resilience so that in the event the power unit is accidentally dropped on the floor, the cover will not be damaged or cracked and require replacement. Repeated testing shows that both the polypropylene handle and the epoxy resin motor housing 14 have been capable of withstanding such abuse without failure and without destroying the integrity of the water seal for the terminal connection of the motor.

As will be evident from the foregoing description, certain aspects of the invention are not limited to the particular details of construction of the example illustrated, and it is contemplated that various modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. For use with an electric motor having a housing with exposed electric terminals at one end thereof, a cover assembly comprising:
 (a) a cover member fitted over the terminal end of the motor housing,
 (b) a flexible electrical cord having a connector held onto the terminals by said cover member,
 (c) said cover member having an opening in one side thereof sufficiently large to allow said connector on said cord to pass therethrough,
 (d) said electric cord extending through said opening,
 (e) a strap member extending along the motor housing and having one end interlocked with said opening, and (f) means to secure the distal end of said strap against the side of the motor housing.

2. For use with an electric motor having a housing with exposed electrical terminals at one end thereof, a cover assembly comprising:
   (a) a cover member fitted over the terminal end of the motor housing,
   (b) a flexible electriral cord having a connector connected to said terminals within said cover member,
   (c) said cover member having an opening in one side thereof sufficiently large to allow said connector on said cord to pass therethrough,
   (d) said electrical cord extending through said opening,
   (e) a strap member extending along the motor housing and having one end interlocked with said opening, and
   (f) means to secure the distal end of said strap against the side of the motor housing.

3. For use with an electric motor having a housing with exposed electrical terminals at one end thereof, a cover assembly comprising:
   (a) a cover member fitted over the terminal end of the motor housing,
   (b) a flexible electrical cord having a connector connected to said terminals within said cover member,
   (c) said cover member having an opening in one side thereof sufficiently large to allow said connector on said cord to pass therethrough,
   (d) said electrical cord extending through said opening, and
   (e) a strap member interlocked with said opening,
   (f) said strap member restricting said opening to the approximate size of said cord.

4. For use with an electric motor having a housing with exposed electrical terminals at one end thereof, a cover assembly comprising:
   (a) a cover member fitted over the terminal end of the motor housing,
   (b) a flexible electrical cord having a connector connected to said terminals within said cover member,
   (c) said cover member having an opening in one side thereof sufficiently large to allow said connector on said cord to pass therethrough,
   (d) said electrical cord extending through said opening,
   (e) said cover member engaging said connector to force said connector into substantially liquid tight engagement with the end of the motor housing.

5. For use with an electric motor having a housing with exposed electrical terminals at one end thereof, a cover assembly comprising:
   (a) a cover member fitted over the terminal end of the motor housing,
   (b) a flexible electrical cord having a connector connected to said terminals within said cover member,
   (c) said cover member having an opening in one side thereof sufficiently large to allow said connector on said cord to pass therethrough,
   (d) said electrical cord extending through said opening,
   (e) said cover member engaging said connector to force said connector into substantially liquid tight engagement with the end of the motor housing,
   (f) a strap member extending along the motor housing and having one end interlocked with said opening, and
   (g) means to secure said distal end of said strap against the side of the motor housing.

6. For use with an electric motor having a housing with exposed electrical terminals at one end thereof, a cover assembly comprising:
   (a) a cover member fitted over the terminal end of the motor housing,
   (b) a flexible electrical cord having a connector connected to said terminals within said cover member,
   (c) said cover member having an opening in one side thereof sufficiently large to allow said connector on said cord to pass therethrough,
   (d) a strap member extending along the motor housing and having one end interlocked with said opening, and
   (e) means to secure the distal end of said strap against the side of the motor housing,
   (f) said strap member having a slot in the end thereof niterlocked with said opening,
   (g) said cover member having a slot contiguous to said enlarged opening,
   (h) said slot in said strap member and said slot in said cover member cooperating to form a small opening of slightly less diameter than said cord,
   (i) said cord extending through said small opening whereby said cord is secured to said cover assembly.

No references cited.

JOHN F. BURNS, *Primary Examiner.*